United States Patent [19]

Hoye et al.

[11] Patent Number: 4,872,672
[45] Date of Patent: Oct. 10, 1989

[54] PROPORTIONAL CONTROL WITH A JOYSTICK DEVICE FOR INPUTTING COMPUTER VARIABLES

[75] Inventors: Robert S. Hoye, Lovettsville; Theodore H. Roach, Leesburg, both of Va.

[73] Assignee: Microcube Corporation, Leesburg, Va.

[21] Appl. No.: 149,922

[22] Filed: Jan. 26, 1988

Related U.S. Application Data

[62] Division of Ser. No. 773,567, Sep. 9, 1985, abandoned.

[51] Int. Cl.[4] ............................................. A63F 9/22
[52] U.S. Cl. .................................... 273/1 E; 273/148 B
[58] Field of Search .......... 273/1 E, 148 B, DIG. 28; 434/43, 51, 30, 34; 340/709, 711, 712, 724, 720, 725

[56] References Cited

U.S. PATENT DOCUMENTS

| | | |
|---|---|---|
| 2,842,645 | 7/1958 | Dalgleish et al. |
| 3,308,675 | 3/1967 | Jonsson . |
| 3,331,971 | 7/1967 | Möller . |
| 3,331,972 | 7/1967 | Möller . |
| 3,541,521 | 11/1970 | Koster . |
| 4,148,014 | 4/1979 | Burson . |
| 4,161,726 | 7/1979 | Burson et al. . |
| 4,190,834 | 2/1980 | Doormink . |
| 4,207,687 | 4/1980 | Hass et al. . |
| 4,306,232 | 12/1981 | Burson . |
| 4,313,227 | 1/1982 | Eder . |
| 4,357,014 | 11/1982 | Baer et al. . |
| 4,390,877 | 6/1983 | Curran . |
| 4,439,649 | 5/1984 | Cecchi . |
| 4,459,578 | 7/1984 | Sava et al. . |
| 4,491,325 | 1/1985 | Bersheim . |
| 4,575,591 | 3/1986 | Lugaresi ........................ 273/148 B |
| 4,600,918 | 7/1986 | Belisomi et al. .................... 340/721 |
| 4,685,678 | 8/1987 | Frederiksen .................... 273/148 B |
| 4,739,316 | 6/1988 | Tokubo . |

OTHER PUBLICATIONS

Fox, J. E., *Keyboard Scanned Capacitive Joystick Cursor Control,* "IBM Technical Disclosure Bulletin", vol. 23, No. 8, Jan. 1981.

Miastkowski, "Microsoft Flight Simulator", *Byte*, vol. 9, No. 3, Mar. 1984, pp. 224–232.

Measurement Systems, Inc., Positioning and Tracking Controls . . . , Catalog C-4 80.

Measurement Systems, Inc., Trackball Products, Catalog TB-179.

*Primary Examiner*—Leo P. Picard
*Attorney, Agent, or Firm*—Cushman, Darby & Cushman

[57] ABSTRACT

A joystick, or any other type of input device which translates motion into a related signal, provides proportional control for a variable associated with a computer program, such, not adapted for proportional joystick control. In one embodiment, one input to the computer causes a variable in a computer program to repeatedly increment in one direction, a second input causes the variable to repeatedly increment in the opposite direction. The first input is provided for a period of time related to a change in joystick position in a first direction and produces the second input for a period of time corresponding to the degree the joystick is moved in a second direction. In another embodiment, the present invention produces keyboard symbol codes to simulate a keyboard. The invention repeatedly produces an appropriate code for a number of times, the number corresponding to the degree to which the joystick was moved. The invention may also accept instructions from the computer to which the joystick is attached for transforming joystick signals into signals usable by the computer.

14 Claims, 4 Drawing Sheets

PROPORTIONAL CONTROL WITH A JOYSTICK DEVICE FOR INPUTTING COMPUTER VARIABLES

This is a division of application Ser. No. 773,567, filed Sept. 9, 1985, which was abandoned upon the filing hereof.

BACKGROUND OF THE INVENTION

1. Field Of The Invention

This invention relates to input devices for computers, and more particularly to input devices, such as joysticks, track balls and mouses, which convert motion and/or position into signals which may be accepted by a computer.

2. Description Of The Prior Art

With the recent popularity of personal computers and video games, the sophistication of the public with respect to computer input devices has increased. The public has realized that certain input devices may be more suitable in certain applications than other input devices. An example of an input device which is being widely employed is the joystick as described in the following U.S. Pat. Nos.: 4,491,325; 4,490,710; 4,489,303; 4,459,578; 4,439,649; 4,357,014; 4,313,227; 4,306,232; 4,190,834; 4,161,726; 4,148,014; 3,739,316; 3,541,521; 3,331,972; 3,308,675 and 2,842,645.

The usefulness of joysticks and other input devices, however, depends entirely upon the program written to accept data from such input devices. A perfect example are flight simulator programs such as marketed by Microsoft for the IBM personal computer and SubLogic for the Atari and Commodore personal computers. The primary manner of inputting data for both of these programs is through a keyboard. For example, three keys are employed to control the rate of roll in the flight simulation. Depression of one key causes the rate of roll variable to be incremented in one direction. Depression of another key causes the rate of roll variable to be incremented in the opposite direction. Finally, a third key is depressed to cause the rate of roll to return instantly to zero so that the roll itself will continue as set just prior to depression of the zeroing key. As explained by Miastkowski, "Microsoft Flight Simulator" BYTE, Volume 9, No. 3, March, 1984, pp. 224–232, such keyboard control is a major drawback to accurately simulating the flying of an airplane.

Nevertheless, such keyboard control is superior to previous attempts to employ a conventional joystick with these flight simulator programs. The flight simulator program by SubLogic does permit rate of roll to be controlled by a joystick. The joystick input port consists of two lines. When only one line assumes a low level, the rate of roll variable repeatedly increments in one direction. When only the other line assumes a low level, the rate of roll variable repeatedly increments in the opposite direction. When both lines assume a low level, the variable remains fixed. When neither line assumes a low level, the variable goes to zero. When the joystick is pushed in one direction, one of the lines assumes a low level, causing the roll variable to be incremented in one direction. When the joystick is pushed in the other direction, the other line assumes a low level, causing the roll variable to be incremented in the opposite direction. When the joystick remains centered, neither line assumes a low level so that the roll variable returns to zero.

Thus, to perform a roll with a joystick with the SubLogic flight simulator program, it is necessary to push the stick in the direction one desires to roll. Then it is necessary to watch the rate of roll indicator until the rate of roll reaches a desired value. Then the joystick is released so that it returns to its centered position to retain that roll. To come out of the roll, it is necessary to push the joystick in the opposite direction and then watch the roll indicator until it is zeroed. Then the joystick is released. This differs from the use of a joystick to control an actual airplane. In an airplane, the degree to which the control stick is pushed from its centered position controls the rate of roll. This will be referred to in this application as proportional control. The joystick control described above with respect to the flight simulator program by SubLogic does not employ proportional control. As long as the joystick is pushed from its centered position, the rate of roll will increment in one direction or the other, independent of joystick position, and will continue to increment until the joystick is returned to its centered position. This is a very unnatural type of control.

With the flight simulator program by Microsoft for the IBM personal computer, it is possible to employ a joystick. However, it is necessary to buy a joystick control card for the computer which is rather expensive.

The use of joysticks to control vehicles is known. U.S. Pat. No. 4,390,877 teaches the use of a joystick to control toy vehicles. In fact, U.S. Pat. No. 3,331,971 teaches a joystick which may be employed to steer airplanes. Finally, U.S. Pat. No. 4,207,687 teaches an extremely complex flight simulator which is obviously extremely expensive. Such a complex simulator is simply beyond the financial capabilities of the general public. Therefore, the '687 patent differs significantly from the joystick patents listed above and from the intent of the present invention.

Typically, the manner in which data from input devices have been employed by a computer program is controlled by that computer program. As a result, the functions of joysticks and other such devices have been fixed.

SUMMARY OF THE INVENTION

The present invention overcomes these problems by providing circuitry which enables proportional control with the typical inexpensive type of joystick or other input device associated with personal computers and video games. Furthermore, the present invention allows enormous flexibility with respect to the functions performed by the joystick or other such input device without modification to the application program employing the input from the joystick.

In one embodiment of the present invention, movement of an input device produces a related signal. The extent to which that signal is changed is then employed to produce an input signal for a computer for a period of time corresponding to the amount of change of the related signal. Such a signal processor is particularly appropriate for connecting a joystick, for example, to a computer such as the Atari or Commodore for controlling a flight simulator game. Because the time that a signal is applied to the computer for incrementing a variable is related to the change of position of the joystick, proportional control results.

In another embodiment, a change in the position of an object, such as a joystick, initiates the sequential generation of a predetermined code corresponding to a keyboard character a number of times. The number of times that the code is sequentially generated is related to the change in position. The generated character codes may then be applied to the keyboard input of a computer. As a result, the joystick, for example, is being employed to create keyboard codes in a manner which is more convenient for an operator. Such an approach may be employed with any program controlled through a keyboard. An example is the flight simulator game by Microsoft on the IBM personal computer.

In the preferred embodiment, not only roll for the flight simulator game is controlled, but also pitch, yaw and throttle.

One of the embodiments of the present invention includes a microprocessor. Embedded in the microprocessor is a boot routine which may be triggered by a predetermined signal from the input device. In response to such a signal, the microprocessor of the present invention will accept any program from its host. In this manner, the input device of the present invention may be programmed in any manner desirable. When the present invention is connected to the keyboard input of a computer, the programmability of the present invention allows a joystick, for example, to be employed with any program which accepts keyboard inputs to control any variable.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which.

DETAILED DESCRIPTION OF THE PRESENTLY PREFERRED EXEMPLARY EMBODIMENTS

Figure 1:
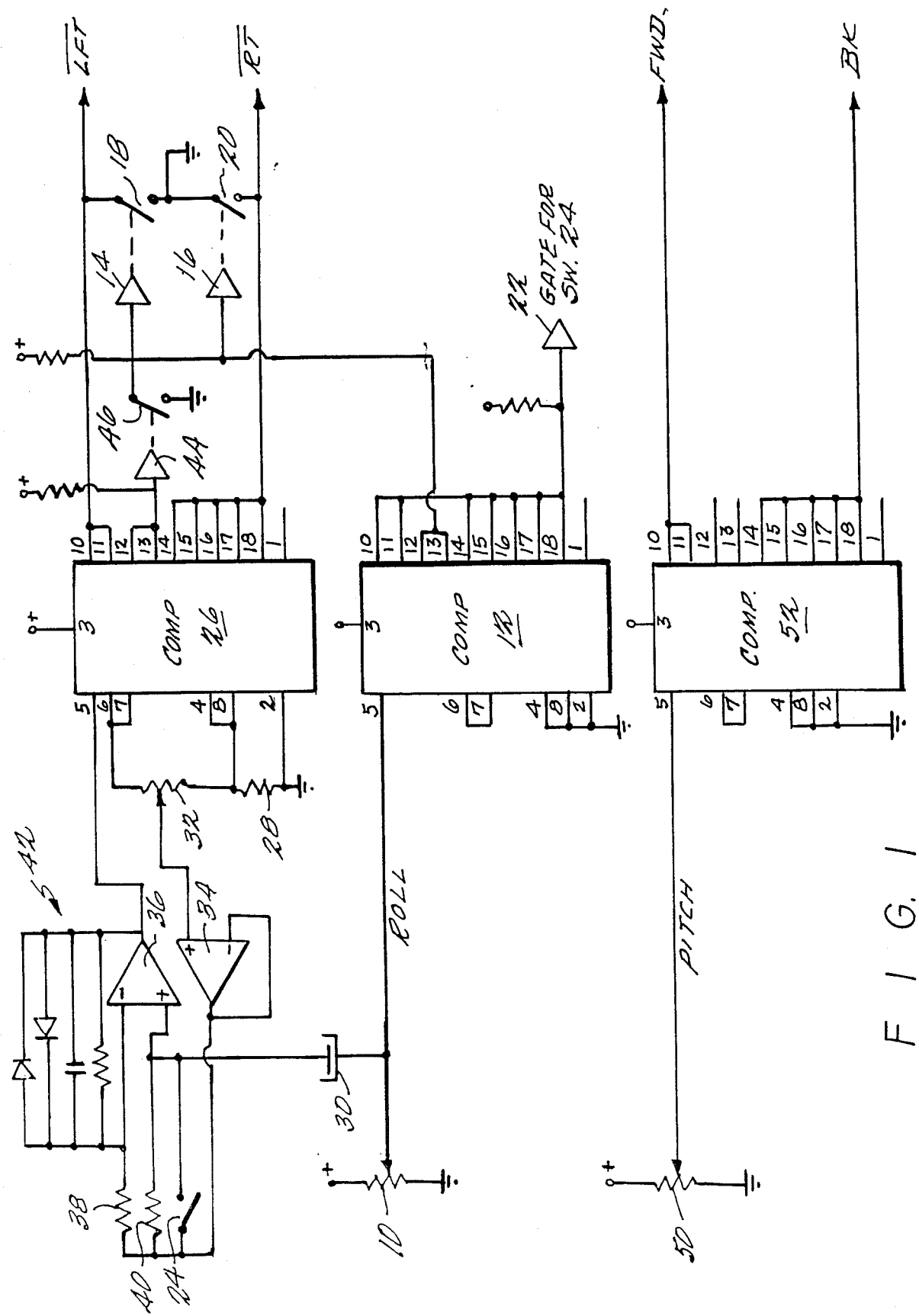
FIG. 1 is a circuit diagram of a first embodiment of the present invention.

The embodiment of FIG. 1 is specifically designed to provide proportional control for a joystick with an Atari or Commodore computer performing the flight simulator program by SubLogic. In FIG. 1, the manner of controlling both roll and pitch is explicitly illustrated. Yaw and throttle can be controlled in a manner similar to pitch. With respect to roll, two lines are applied to the computer, an $\overline{\text{LFT}}$ line and an $\overline{\text{RT}}$ line. When the $\overline{\text{LFT}}$ line is low and the $\overline{\text{RT}}$ line is high, a variable related to rate of roll begins to increment in one direction, causing the rate of roll in the simulation to increase to the left. When the $\overline{\text{RT}}$ line is low and the $\overline{\text{LFT}}$ line is high, the rate of roll variable begins to increment in the opposite direction, increasing the rate of roll to the right. When both lines are low, the rate of roll variable is maintained constant. When both lines are high, the rate of roll variable returns to zero so that the particular roll that has been entered is maintained.

The circuitry illustrated generates these signals in response to the output of a joystick represented as potentiometer 10. The center tap of potentiometer 10 is connected to comparator 12. In the preferred embodiment, comparator 12 is LED driver chip LM3914. As is well known to those of ordinary skill in the art, a voltage divider chain is connected between pins 6 and 4 of this chip. Each node on the voltage divider chain is connected to one input of a comparator. The other input of each of the comparators is connected to the input signal. Also within this chip is a 1.2 volt precision voltage source. The 1.2 volts appears across pins 7 and 8. Since pins 6 and 7 and pins 4 and 8 of comparator 12 are jumpered together, the 1.2 volt source is connected across the voltage divider chain. The 1.2 volts conveniently corresponds to the operating voltage range produced by joystick 10. In response to the comparisons performed by the comparators within comparator 12, one or possibly two of output pins 10 through 18 become grounded (the chip does include a bit of hysteresis in that near a threshold value, two output pins will become grounded) as an indication of the input voltage. When joystick 10 is centered, one or both of output pins 12 and 13 become grounded. Output pins 12 and 13 are connected to gates 14 and 16 which control switches 18 and 20, respectively. Switches 18 and 20 selectively ground lines $\overline{\text{LFT}}$ and $\overline{\text{RT}}$, respectively. Output lines 10, 11 and 14 through 18 are connected to gate 22 to control switch 24. When any of gates 14, 16 and 22 are high, respective switches 18, 20 and 24 become closed. Thus, switch 24 is closed when the joystick is centered but becomes opened as soon as the joystick is moved from its centered position.

Comparator 26 is the same chip as comparator 12. However, it is configured a bit differently. Specifically, although the 1.2 volt voltage source is also connected in parallel with the internal voltage divider chain, the bottom of both the voltage source and the divider chain is connected to ground through resistor 28. This prevents the polarity of the voltage on capacitor 30 from ever reversing. Connected in parallel with the voltage source and the voltage divider network is potentiometer 32. The wiper arm of the potentiometer is connected to buffer 34 which is, in turn, connected to buffer 36 through switch 24 and resistors 38 and 40. Feedback network 42 simply adds stability. The position of the wiper arm of potentiometer 30 is adjusted so that when the voltage on the wiper arm is applied through buffers 34 and 36 to comparator 26 with the charge across capacitor 30 stabilized, at least one of output pins 12 and 13 of comparator 26 is grounded.

Capacitor 30 couples the signal from joystick potentiometer 10 to buffer 36. With this configuration, comparator 12 may be considered a zero detector while comparator 36 may be considered an AC stick movement detector.

Output pins 12 and 13 of comparator 26, indicative of a stabilized joystick position, is connected to gate 44 which controls switch 46. When switch 46 is closed, it grounds gates 14 and 16, opening switches 18 and 20. Output pins 10 and 11 of comparator 26 are connected to form line $\overline{\text{LFT}}$. Output pins 14 through 18 of comparator 26 are connected to form line $\overline{\text{RT}}$.

In operation, when joystick potentiometer 10 produces a voltage indicative of a centered position, at least one of output pins 12 and 13 of comparator 12 is grounded, opening switches 18 and 20. At the same time, gate 22 of switch 24 is high, closing switch 24. Therefore, the reference voltage from buffer 34 is applied directly to buffer 36 and the input of comparator 26. Therefore, output pins 12 and 13 of comparator 26 are low, opening switch 46 and output pins 10, 11 and 14 through 18 are high, so that both of lines $\overline{\text{LFT}}$ and $\overline{\text{RT}}$ are high. When applied to the flight simulator program by SubLogic operating on an Atari or Commodore computer, the rate of roll variable is set to zero.

Suppose the joystick is then moved so as to increase the voltage produced by a potentiometer 10. Instantly, output pins 12 and 13 of comparator 12 will become high. Since switch 46 is open, switches 18 and 20 will both close, at least momentarily, grounding lines $\overline{\text{LFT}}$ and $\overline{\text{RT}}$, so as to produce a hold on the value of the rate of roll variable. At the same time, one of output lines 14 through 18 of comparator 12 will become grounded, opening switch 24.

As a result of the increased output voltage from potentiometer 10, the voltage between capacitor 30 and buffer 36 will suddenly increase. This is applied to the input of comparator 26 causing one of output lines 14 through 18 to become grounded while output pins 12 and 13 become high. This closes switch 46, grounding gates 14 and 16 to open switches 18 and 20 to release the hold condition. At the same time, the grounding of one of output pins 14 through 18 of comparator 26 causes line $\overline{\text{RT}}$ to become low, causing the rate of roll variable to begin incrementing so as to increase the rate of roll to the right.

The voltage on capacitor 30 will gradually discharge through resistor 40 to the reference voltage value at the output of buffer 34. The rate of discharge is controlled by the values of resistor 40 and capacitor 30. In the preferred embodiment, capacitor 30 is a 2.2 microfarad capacitor and resistor 40 has a value of 1 megohm. Once the junction of capacitor 30 and buffer 36 has reestablished itself at the reference voltage, output pins 12 and 13 of comparator 26 again become low, opening switch 46. Since output pins 12 and 13 of comparator 12 are high since the joystick remains off center, opening switch 46 causes switches 18 and 20 to close, so that output lines $\overline{\text{RT}}$ and $\overline{\text{LFT}}$ are both low, sending a hold command to the computer so that the value of the rate of roll variable is held.

Note that the degree to which joystick 10 moves controls the voltage change from potentiometer 10. This is related to the change in voltage at the point between capacitor 30 and buffer 36. Since the charging rate for capacitor 30 is relatively constant, the period of time that line $\overline{\text{RT}}$ remains low while line $\overline{\text{LFT}}$ remains high is related to the degree that the joystick lever is moved. Thus, as a result of the circuitry described above, the output line $\overline{\text{RT}}$ remains low for a period of time corresponding to the change in the voltage of potentiometer 10 which is, in turn, related to the degree that the joystick is moved.

If the joystick is moved in the opposite direction, the voltage between capacitor 30 and buffer 36 suddenly decreases, causing output pins 10 and 11 of comparator 36 to become low while output pins 12 through 18 remain high. This causes line $\overline{\text{LFT}}$ to become low while line $\overline{\text{RT}}$ is high. This condition remains until the output of buffer 34 charges capacitor 30 back to the reference voltage through resistor 40, at which time both output lines become low.

In this manner, movement of an input device can proportionally control changes in a variable in a computer in which the variable is incremented in one direction when only one input line is low, is incremented in the other direction when only the other input line is low, is held constant when both input lines are low and assumes a predetermined value when both input lines are high.

Potentiometer 50 associated with the pitch joystick control has a wiper arm connected to the input of comparator 52. Comparator 52 is the same chip as comparator 12 and is configured in an identical manner. When the joystick is centered, potentiometer 50 produces a voltage which causes output pins 10, 11 and 14 through 18 to become high. As a result, the pitch variable in the computer does not change. When the joystick associated with pitch is moved off center, the voltage produced by potentiometer 50 causes one of output pins 10, 11 and 14 through 18 of comparator 50 to become low, causing one of lines $\overline{\text{FWD}}$ and $\overline{\text{BK}}$ to become low. This causes the pitch variable to begin incrementing to cause pitch to either increase or decrease. When the joystick is released to return to a centered position, the pitch variable is maintained. Variables associated with throttle position and yaw can also be controlled similarly to pitch or roll.

Figure 2:
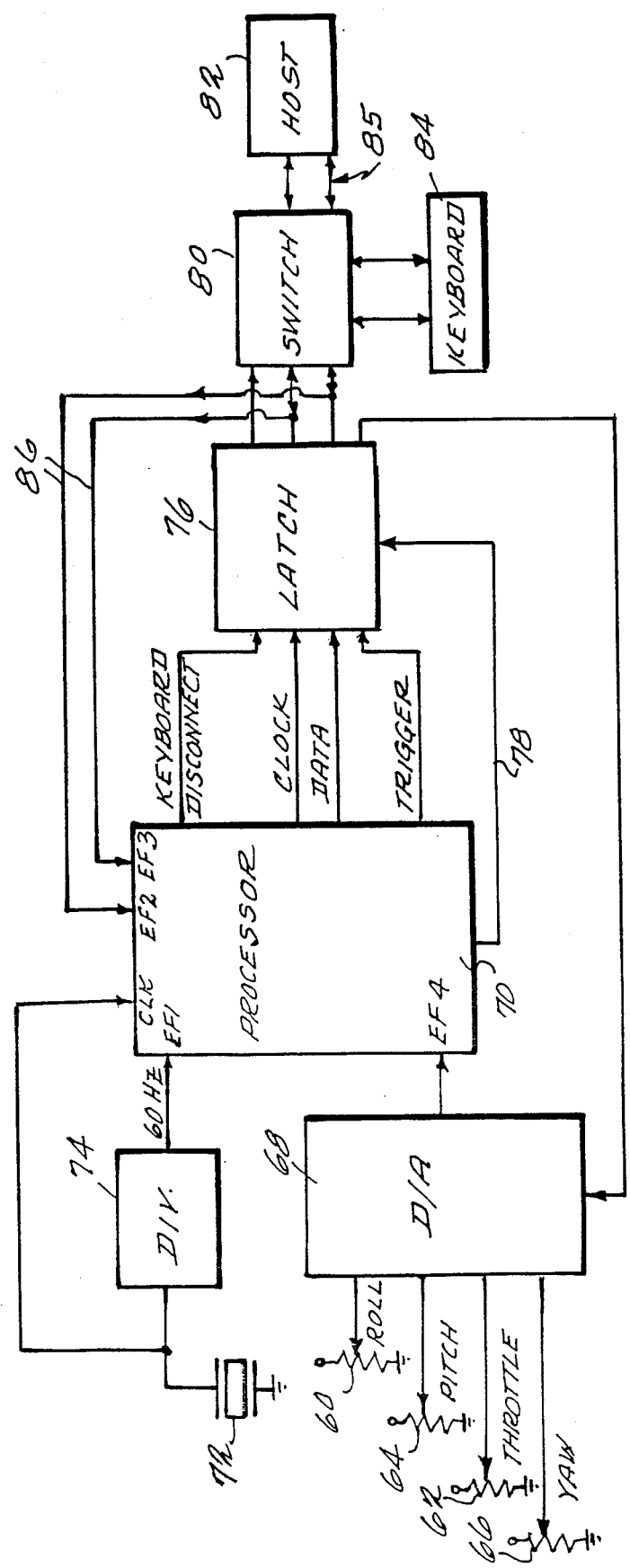
FIG. 2 is a block diagram of a second embodiment of the present invention.

FIG. 2 illustrates a second embodiment of the present invention. This embodiment employs the output from joystick potentiometers to generate character codes which simulate a keyboard. These codes are applied to the keyboard input of a computer, i.e., the terminal of the computer to which a keyboard is normally connected, to control variables in a computer program. Thus, potentiometers 60 through 66 are controlled by joysticks. In fact, the four potentiometers may be associated with the two independent axes of two joysticks. Potentiometer 60 is associated with roll, potentiometer 62 is associated with throttle, potentiometer 64 is associated with pitch and potentiometer 66 is associated with yaw. The joysticks associated with roll, pitch and yaw are preferably centering whereas the joystick control for throttle is preferably noncentering. The wiper arms of potentiometers 60 through 66 are all applied to inputs of digital-to-analog converter 68. In the preferred embodiment, converter 68 is an RC output detector such as the chip LM1871. In the manner in which this chip is being employed in the present invention, in response to a trigger signal, its output assumes consecutive high levels for periods of time associated with the voltages produced by potentiometers 60 through 66, sequentially, with each high level separated from the next by a low level of 500 microseconds.

The output of converter 68 is applied to an input of processor 70. In the preferred embodiment, processor 70 is the COSMAC CDP 1804 manufactured by RCA. This microcomputer includes internally all ROM and RAM memory necessary for this application, and additionally will support external memory as desired. Crystal 72 provides a clock signal for the operation of processor 70. The output of crystal 72 is also frequency divided by divider 74 to produce a 60 Hz. signal which is applied to an input of processor 70. Processor 70 generates four output signals which are applied to latch 76 and stored there in response to a latching signal from processor 70 on line 78. A trigger signal from processor 70 through latch 76 is applied to converter 68 to initiate a conversion cycle. When processor 70 outputs data, it also generates a keyboard disconnect signal along with a clock signal and a data signal. The keyboard disconnect signal is stored in latch 76 to cause switch 80 to connect latch 76 to host computer 82 which may be, for example, an IBM personal computer executing a flight simulator program such as marketed by Microsoft. When the keyboard disconnect signal is not being applied to switch 80, switch 80 causes keyboard 84 to be connected to terminal 85 of host computer 82 to which keyboard 84 is normally connected. With the IBM computer, the keyboard presents data to the computer along with a clock signal which causes the computer to accept the data. Thus, processor 70 generates data and clock signals to simulate the output of keyboard 84 in providing data to terminal 85 of host computer 82. Also, with the IBM computer, computer 82 sends information to keyboard 84 through terminal 85. Typically, such data represents diagnostics. However, the capability exists for sending any sort of data from host computer 82 through its keyboard terminal 85. Accordingly, lines 86 are provided from switch 80 to processor 70 so that data and clock signals from host 82 may be inputted to processor 70.

Figure 3:
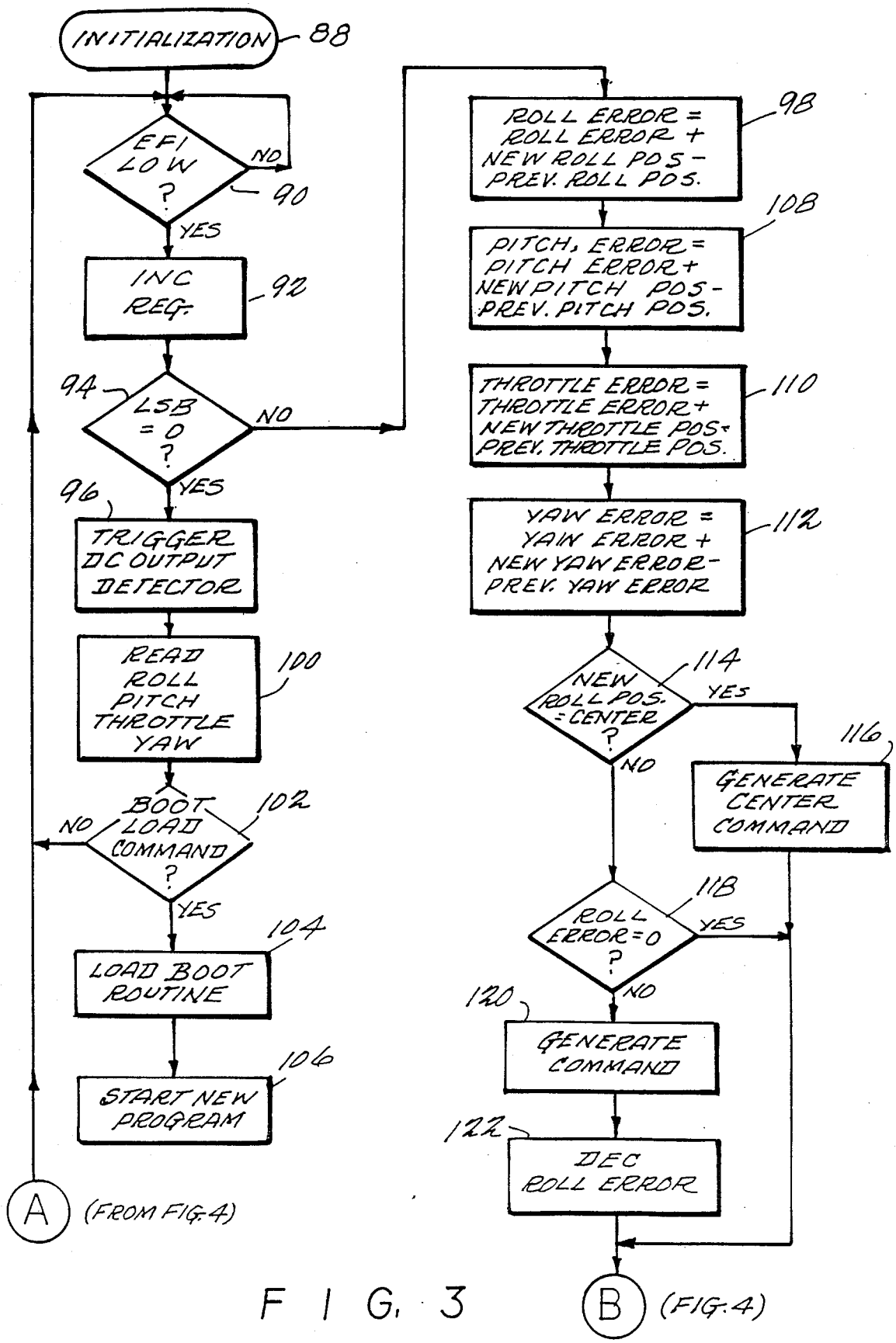
FIGS. 3 and 4 are a flow chart of the manner of operation of the second embodiment.
Figure 4:
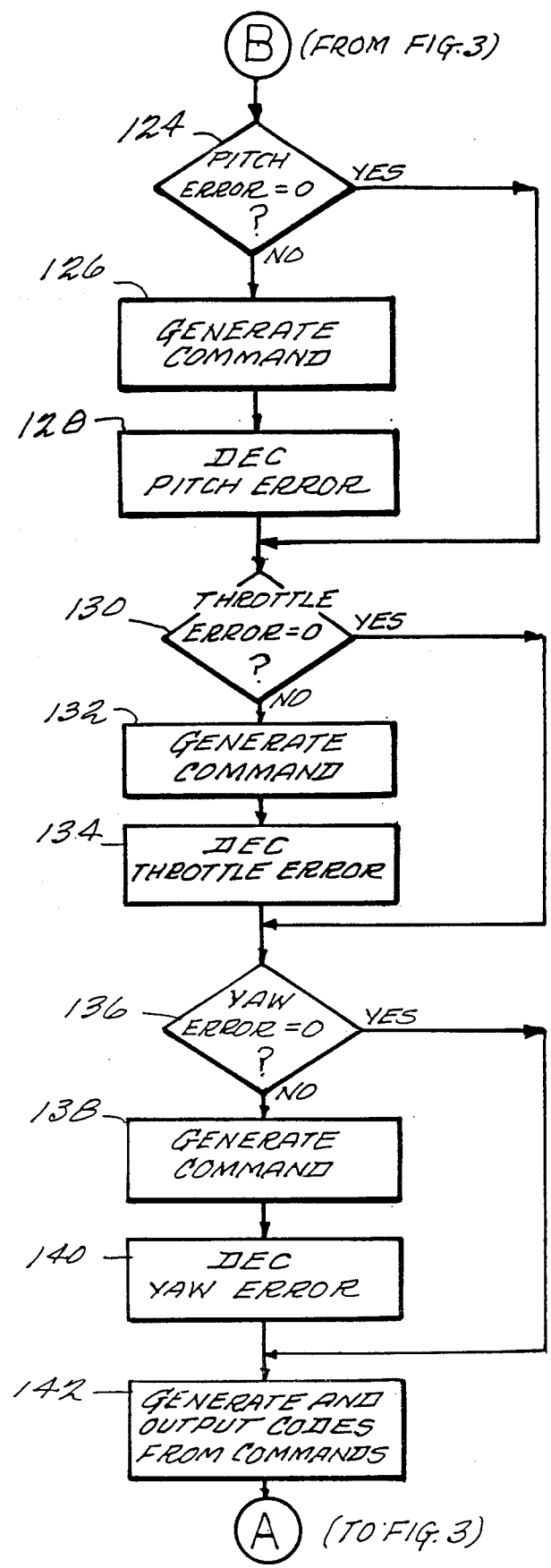

The manner in which the embodiment of FIG. 2 operates is illustrated in FIGS. 3 and 4. After initialization at step 88, processor 70 determines whether its EF1 input is low. As illustrated in FIG. 2, this is the input that receives a 60 Hz. signal from divider 74. Since a negative determination at step 90 causes the program to loop, step 90 limits execution of the program to 60 times per second.

Once step 90 determines that the EF1 input is low, step 92 causes a counting register to be incremented. At step 94, it is determined whether the least significant bit of that register is zero. If it is zero, step 96 is executed. However, if the least significant bit of the counter register is not zero, step 98 is executed. Since the register stores in binary, step 96 and the following steps are executed once every thirtieth of a second alternately with step 98 and the following steps. This slows data transmission to host computer 82 to a rate which can be accepted by host computer 82.

If the determination at step 94 is positive, step 96 causes generation of the trigger output by processor 70 which is stored in latch 76 and applied to converter 68. This causes converter 68 to sequentially produce signals whose period relates to the voltages which are generated by potentiometers 60 through 66. At step 100, these values representing roll, pitch, throttle and yaw are read by processor 70.

At step 102, it is determined whether the inputs to processor 70 are configured so as to provide processor 70 with a boot load command. Any configuration desired may be employed as the command. If the determination at step 102 is negative, processing returns to step 90. Thus, steps 90 through 96, 100 and 102 cause processor 70 to read inputs every thirtieth of a second.

If the determination at step 102 is positive, a boot routine stored in ROM within processor 70 is executed by processor 70. Boot routines are extremely well known and any may be acceptable. In a boot routine, processor 70 produces a keyboard disconnect signal at its output which causes switch 80 to connect host computer 82 to processor 70. Then, a program may be loaded from host computer 82, through switch 80 and over lines 86 into processor 70. This program may then generate signals rom processor 70 to host computer 82 in response to particular inputs from potentiometers 60 through 66. In this manner, the input device such as a joystick may be programmed in any manner desirable to generate keyboard simulating signals. Thus, when appropriately programmed, processor 70 can be employed so that a joystick or other input device may be utilized in a program which was not originally written to accept such a motion or position related input. After the boot routine is loaded at step 104, the new program which has just been loaded in processor 70 may then be executed at step 106.

If the determination at step 94 is negative, steps 98 and following are performed. These steps compare the previous joystick position with the new joystick position and generate keyboard character codes necessary to cause the program variables to correspond to the new position of the joystick. To accomplish this, it is necessary to maintain an indication of the previously determined joystick position, the new joystick position and the number of codes that must be generated to bring the variable and computer into correspondence with the joystick position. Thus, at step 98, ROLL ERROR represents the number of codes that must be generated to cause the roll variable to correspond with the joystick position. The new roll position represents the latest roll voltage read at step 100 in terms of the number of codes that must be generated to change the roll variable to a corresponding value. Thus, suppose it is necessary to generate a code forty times to cause the roll variable to swing from one extreme to the opposite extreme. A voltage change for the roll joystick of 1/40 of the voltage difference between opposite extreme joystick positions represents a change of one in terms of the number of codes that must be generated. If the roll variable can change from one extreme to the other by the generation of forty codes, then the joystick voltage may be assigned a corresponding number from zero to forty (or −20 to +20) and it is these units that must be maintained. Previous roll position represents the previous voltage read at step 100 in the same units. It is necessary to keep track of the previous roll position in order to determine whether the roll joystick has moved. At step 98, in order to determine the updated ROLL ERROR, it is necessary to add to the previous ROLL ERROR the difference between the new roll joystick position and the previous roll joystick position. Similarly, at steps 108, 110 and 112, PITCH ERROR, THROTTLE ERROR and YAW ERROR, respectively, are updated.

Step 114 determines whether the new roll position represents the voltage from the roll joystick when the joystick is centered. If it is, then at step 116 processor 70 generates a center command for the roll variable. When processed, this command will cause processor 70 to generate a code which will instruct the computer to adopt a zero value for the roll variable.

If the determination at step 114 is negative, step 118 determines whether the ROLL ERROR is zero. If it is zero, it means that the roll variable and the roll joystick position correspond so that no change needs to be made to the roll variable. If the determination at step 118 is negative, then the roll variable needs to be incremented in one direction or the other depending on whether the variable ROLL ERROR has a negative or positive value. At step 120, a corresponding command is generated. That is, one command is generated to increment the roll variable in one direction and a different command is generated to increment the roll variable in the opposite direction. At step 122, ROLL ERROR is decremented toward zero. As will be developed below, the command generated in 120 results in the production of a keyboard code to adjust the roll variable toward the desired value as indicated by the joystick. Since the roll variable is one step closer to the desired value, it is appropriate to decrement the ROLL ERROR toward zero.

As illustrated in FIG. 4, steps 124, 126 and 128 are similar to steps 118, 120 and 122 except that pitch is being processed instead of roll. Similarly, steps 130 through 134 and steps 136 through 140 correspond to steps 118 through 122 except that throttle and yaw, respectively, are being processed. Finally, at step 142, all of the commands that were generated in steps 116, 120, 126, 132 and 138 are employed to cause processor 40 to output keyboard character codes to latch 76. At the same time, the keyboard disconnect signal through latch 76 causes switch 80 to connect latch 76 to host computer 82. In this manner, keyboard character codes are transmitted from processor 70 to the host computer in order to increment the appropriate variables in host computer 82.

After step 142, processing returns to step 90 so that the joystick voltages will again be read in the following sixtieth of a second.

Although only a few embodiments of this invention has been described in detail above, those skilled in the art will readily appreciate that many modifications are possible in the preferred embodiments without materially departing from the novel teachings and advantages of this invention. For example, the embodiment of FIG. 1 is executed in analog integrated circuitry whereas the embodiment of FIG. 2 is executed in digital technology. Obviously, the first embodiment may be performed with a processor programmed to perform the functions described above with respect to the first embodiment. Similarly, the second embodiment may be accomplished with integrated analog components. In fact, both embodiments may be executed with more discrete analog components. Such changes are well within the level of ordinary skill in the art.

According, all such modifications are intended to be included within the scope of this invention as defined by the following claims.

What is claimed is:

1. Apparatus for providing a joystick output to a computer comprising:
   a joystick including a lever and means for translating a position of said lever into a corresponding signal;
   means for sequentially generating a predetermined code a specific number of times, said specific number being related to a characteristic of said corresponding signal so that said specific number is related to an amount of change in position of said lever to provide proportional control; and
   means for applying said code to said computer.

2. Apparatus as in claim 1 wherein said applying means includes a switch controlled by said generating means for connecting said generating means to a keyboard terminal of said computer when said generating means generates said predetermined code.

3. Apparatus as in claim 1 wherein said generating means sequentially generates a first predetermined code a first number of times when said position is changed to one direction and generates a second predetermined code a second number of times when said position is changed to an opposite direction to said one direction.

4. Apparatus as in claim 3 wherein said generating means also generates a third predetermined code in response to a predetermined said corresponding signal.

5. Apparatus as in claim 3 wherein said generating means includes means for generating said first predetermined code for causing rate of roll in a flight simulator game executed on said computer to change by an incremental amount in one direction and for generating said second predetermined code for causing said rate of roll in said flight simulator game to change by an incremental amount in another direction each time said applying means applies said first and second predetermined codes to said computer, respectively.

6. Apparatus as in claim 3 wherein said generating means includes means for generating said first predetermined code for causing pitch in a flight simulator game executed by said computer to change by an incremental amount in one direction and for generating said second predetermined code for causing said pitch in said flight simulator game to change by an incremental amount in another direction each time said applying means applies said first and second predetermined codes to said computer, respectively.

7. Apparatus as in claim 3 wherein said generating means includes means for generating said first predetermined code for causing yaw in a flight simulator game executed by said computer to change by an incremental amount in one direction and for generating said second predetermined code for causing said yaw in said flight simulator game to change by an incremental amount in another direction each time said applying means applies said first and second predetermined codes to said computer, respectively.

8. Apparatus as in claim 3 wherein said generating means includes means for generating said first predetermined code for causing throttle in a flight simulator game executed on said computer to change by an incremental amount in one direction and for generating said second predetermined code for causing said throttle in said flight simulator game to change by an incremental amount in another direction each time said applying means applies said first and second predetermined codes to said computer, respectively.

9. Apparatus as in claim 1 wherein said generating means includes means for sequentially generating said predetermined code for causing rate of roll in a flight simulator game executed by said computer to be changed by an incremental amount each time said applying means applies said predetermined code to said computer.

10. Apparatus as in claim 1 wherein said generating means includes means for sequentially generating said predetermined code for causing pitch in a flight simulator game executed by said computer to be changed by an incremental amount each time said applying means applies said predetermined code to said computer.

11. Apparatus as in claim 1 wherein said generating means includes means for sequentially generating said predetermined code for causing yaw in a flight simulator game executed by said computer to be changed by an incremental amount each time said applying means applies said predetermined code to said computer, respectively.

12. Apparatus as in claim 1 wherein said generating means includes means for sequentially generating said predetermined code for causing throttle in a flight simulator game executed by said computer to be changed by an incremental amount each time said applying means applies said predetermined code to said computer.

13. Apparatus as in claim 1 wherein:
   said apparatus includes a plurality of joysticks having levers and means for translating positions of said levers into corresponding signals; and
   said generating means includes means for: (1) generating a first predetermined code a specific number of times, said specific number being related to a characteristic of one of said corresponding signals, said first predetermined code causing rate of roll in a flight simulator game executed by said computer to change by an incremental amount each time said first predetermined code is applied to said computer by said applying means, (2) generating a second predetermined code a specific number of times related to a characteristic of one of said corresponding signals, said second predetermined code causing said rate of roll to change by an incremental amount in another direction each time said applying means applies said second predetermined code to said computer, (3) generating a third predetermined code a specific number of times related to a characteristic of one of said corresponding signals, said third predetermined code causing pitch in said flight simulator game to change an incremental amount in one direction each time said applying means applies said third predetermined code to said computer, (4) generating a fourth predetermined code a specific number of times related to a characteristic of one of said corresponding signals, said fourth predetermined code causing said pitch to change by an incremental amount in another direction each time said applying means applies said fourth predetermined code to said computer, (5) generating a fifth predetermined code a specific number of times related to a characteristic of one of said corresponding signals, said fifth predetermined code causing yaw in said flight simulator game to change by incremental amount in one direction each time said applying means applies said fifth predetermined code to said computer, (6) generating a sixth predetermined code a specific number of times related to a characteristic of one of said corresponding signals, said sixth predetermined code causing said yaw to change by an incremental amount in another direction each time said applying means applies said sixth predetermined code to said computer, (7) generating a seventh predetermined code a specific number of times related to a characteristic of one of said corresponding signals, said seventh predetermined code causing throttle in a flight simulator game executed by said computer to change by an incremental amount in one direction each time said applying means applies said seventh predetermined code to said computer, and (8) generating an eighth predetermined code a specific number of times related to a characteristic of one of said corresponding signals, said eighth predetermined code causing said throttle to change by an incremental amount in another direction each time said applying means applies said eighth predetermined code to said computer.

14. Apparatus as in claim 1 wherein:
said apparatus includes a plurality of joysticks having levers and means for translating positions of said levers into corresponding signals; and
said generating means includes means for: 1) generating a first predetermined code corresponding to a first keyboard character a specific number of times, said specific number being related to a characteristic of one of said corresponding signals, said first predetermined code causing rate of roll in a flight simulator game executed by said computer to change by an incremental amount each time said applying means applies said first predetermined code is applied to a keyboard input of said computer, 2) generating a second predetermined code corresponding to a second keyboard character a specific number of times related to a characteristic of one of said corresponding signals, said second predetermined code causing said rate of roll to change by an incremental amount in another direction each time said applying means applies said second predetermined code to said keyboard input of said computer, 3) generating a third predetermined code corresponding to a third keyboard character a specific number of times related to a characteristic of one of said corresponding signals, said third predetermined code causing pitch in said flight simulator game to change by an incremental amount in one direction each time said applying means applies said third predetermined code to said keyboard input of said computer, 4) generating a fourth predetermined code corresponding to a fourth keyboard character a specific number of times related to a characteristic of one of said corresponding signals, said fourth predetermined code causing said pitch to change by an incremental amount in another direction each time said applying means applies said fourth predetermined code to said keyboard input of said computer, 5) generating a fifth predetermined code corresponding to a fifth keyboard character a specific number of times related to a characteristic of one of said corresponding signals, said fifth predetermined code causing yaw in said flight simulator game to change by an incremental amount in one direction each time said applying means applies said fifth predetermined code to said keyboard input of said computer, 6) generating a sixth predetermined code corresponding to a sixth keyboard character a specific number of times related to characteristic of one of said corresponding signals, said sixth predetermined code causing said yaw to change by an incremental amount in another direction each time said applying means applies said sixth predetermined code to said keyboard input of said computer, 7) generating a seventh predetermined code corresponding to a seventh keyboard character a specific number of times related to a characteristic of one of said corresponding signals, said seventh predetermined code causing throttle in a flight simulator game executed on said computer to change by an incremental amount in one direction each time said applying means applies said seventh predetermined code to said keyboard input of said computer, and 8) generating an eighth predetermined code corresponding to a eighth keyboard character a specific number of times related to a characteristic of one of said corresponding signals, said eighth predetermined code causing said throttle to change by an incremental amount in another direction each time said applying means applies said eighth predetermined code to said keyboard input of said computer.

* * * * *